United States Patent
Okubayashi

(10) Patent No.: US 9,876,452 B1
(45) Date of Patent: Jan. 23, 2018

(54) ROTOR POSITION SENSING SYSTEM FOR PERMANENT MAGNET SYNCHRONOUS MOTORS AND RELATED METHODS

(71) Applicant: SEMICONDUCTOR COMPONENTS INDUSTRIES, LLC, Phoenix, AZ (US)

(72) Inventor: Masanori Okubayashi, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/382,160

(22) Filed: Dec. 16, 2016

(51) Int. Cl.
 *H02P 6/00* (2016.01)
 *H02K 29/06* (2006.01)
 *H02P 6/18* (2016.01)

(52) U.S. Cl.
 CPC .......... *H02P 6/186* (2013.01); *H02P 2203/01* (2013.01)

(58) Field of Classification Search
 CPC .......... H02P 6/085; H02P 6/20; H02P 25/089; H02P 6/18; H02P 6/185; H02P 6/21; H02P 6/187
 USPC ............. 318/400.32, 400.03, 400.11, 400.33
 See application file for complete search history.

(56) References Cited

U.S. PATENT DOCUMENTS

| 4,641,066 | A * | 2/1987 | Nagata | H02P 6/187 318/400.11 |
| 5,640,073 | A * | 6/1997 | Ikeda | H02P 6/085 318/400.03 |
| 6,608,462 | B2 * | 8/2003 | Slater | H02P 6/21 318/400.01 |
| 7,893,649 | B2 * | 2/2011 | Lamprecht | H02P 6/085 318/720 |
| 8,400,086 | B2 * | 3/2013 | Cheng | H02P 6/18 318/400.01 |
| 2002/0089301 | A1 * | 7/2002 | Slater | H02P 6/21 318/701 |
| 2008/0303516 | A1 * | 12/2008 | Lamprecht | H02P 6/085 324/207.25 |
| 2010/0181952 | A1 * | 7/2010 | Cheng | H02P 6/20 318/400.33 |
| 2012/0181963 | A1 | 7/2012 | Wang | |
| 2014/0232311 | A1 | 8/2014 | Hill | |

FOREIGN PATENT DOCUMENTS

| JP | 2004-040943 | 2/2004 |
| JP | 2007-014074 | 1/2007 |
| JP | 2014-113054 | 6/2014 |

* cited by examiner

*Primary Examiner* — Paul Ip
(74) *Attorney, Agent, or Firm* — IPTechLaw

(57) ABSTRACT

Implementations of a system for sensing rotor position of a PMSM may include: a controller which may be coupled with the PMSM. The controller may be configured to apply a plurality of voltage vectors to the PMSM to generate a plurality of sensing signals from a stator of the PMSM in response. A comparator may be coupled to the PMSM configured to receive and to compare each one of the plurality of sensing signals with a threshold voltage. A rise time measurement circuit may calculate a plurality of rise times using the plurality of sensing signals in response to receiving a signal from the comparator. The rotor-angle estimation circuit may be configured to identify from the plurality of rise times a shortest rise time and a voltage vector corresponding with the shortest rise time and thereby identify the position of the rotor of the PMSM.

19 Claims, 12 Drawing Sheets

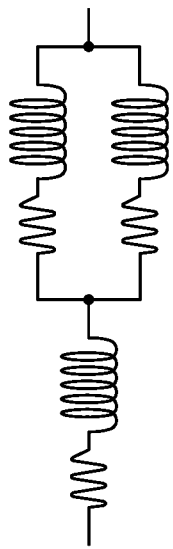     
FIG. 7  FIG. 8
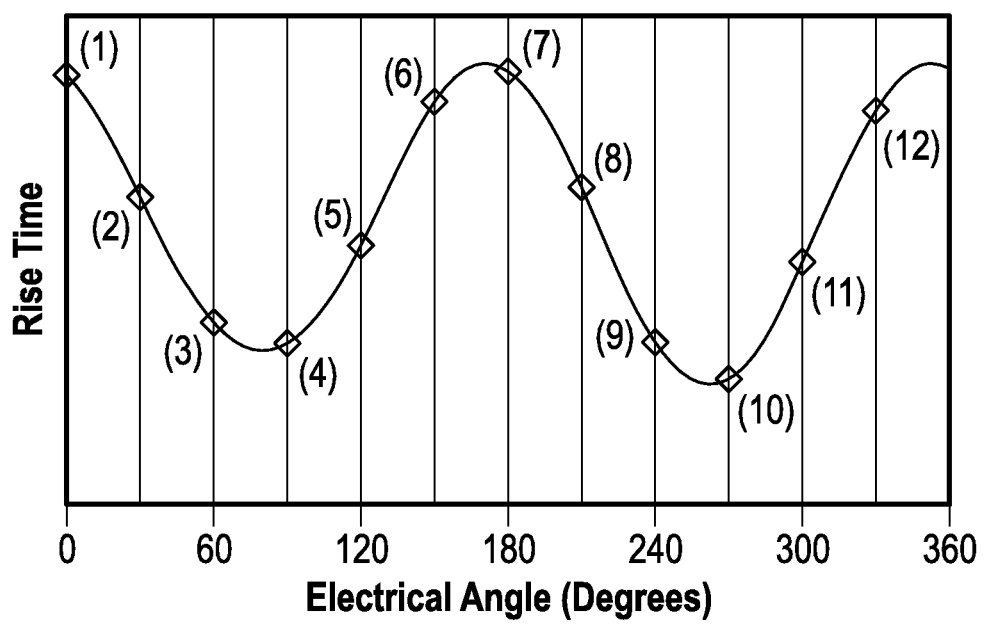
FIG. 9

ROTOR POSITION SENSING SYSTEM FOR PERMANENT MAGNET SYNCHRONOUS MOTORS AND RELATED METHODS

BACKGROUND

1. Technical Field

Aspects of this document relate generally to permanent magnet synchronous motors. More specific implementations involve rotor position detection of permanent magnet synchronous motors.

2. Background

Torque in a permanent magnet synchronous motor is created by applying out of phase currents to the stator or field windings of the motor. The out of phase currents create a magnetic flux in the motor which results in the rotation of a magnetic rotor. The amount of torque is controlled by the out of phase currents applied and the position of the magnetic rotor. Various conventional position sensing systems for permanent magnet synchronous motors are disclosed in U.S. Patent Application Publication No. 2010/0181952 to Kuang-Yao Cheng, entitled "Initial rotor position detection for permanent magnet synchronous motors," published Jul. 22, 2010 and in U.S. Pat. No. 5,028,852 to John C. Dunfield entitled "Position detection for a brushless DC motor without hall effect devices using a time differential method," issued Jul. 2, 1991, the disclosures of each of which are hereby incorporated entirely herein by reference.

SUMMARY

Implementations of a system for sensing rotor position of a permanent magnet synchronous motor (PMSM) may include: a controller which may be coupled with the PMSM. The controller may be configured to apply a plurality of voltage vectors to the PMSM to generate a plurality of sensing current signals from a stator of the PMSM in response. A resistor may be coupled to the stator of the PMSM. The resistor may be configured to receive the plurality of sensing current signals and generate a corresponding plurality of sensing voltage signals. An amplifier may be coupled to the resister. The amplifier may be configured to receive and to amplify the plurality of the sensing voltage signals. A comparator may be coupled to the amplifier and to a threshold voltage generator. The comparator may be configured to receive and to compare each one of the plurality of amplified sensing voltage signals with a threshold voltage generated by the threshold voltage generator. A rise time measurement circuit may be coupled to the comparator. The rise time measurement circuit may be configured to calculate a plurality of rise times using the plurality of amplified sensing voltage signals in response to receiving a signal from the comparator. A memory may be coupled with the rise time measurement circuit, which may be configured to store the plurality of rise times. A rotor-angle estimation circuit may be coupled with the memory. The rotor-angle estimation circuit may be configured to identify from the plurality of rise times a shortest rise time and a voltage vector corresponding with the shortest rise time. The rotor-angle estimation circuit may identify at least two adjacent voltage vectors to the voltage vector with the shortest rise time. The rotor-angle estimation circuit may average, sum or weighted sum the rise times of the voltage vector corresponding with the shortest rise time and its at least two adjacent voltage vectors to form an average first rise time value, a summed first rise time value, or a weighted summed first rise time value, respectively. The rotor-angle estimation circuit may identify the voltage vector that is 180 degrees out of phase with the voltage vector corresponding to the shortest rise time. The rotor-angle estimation circuit may identify at least two adjacent voltage vectors to the voltage vector that is 180 degrees out of phase. The rotor-angle estimation circuit may average, sum, or weighted sum the rise times of the voltage vector that is 180 degrees out of phase and its at least two adjacent voltage vectors to form a second average rise time value, a summed second rise time value, or a weighed summed second rise time value, respectively. The rotor-angle estimation circuit may calculate a rotor position relative to the stator of the PMSM through identifying a lowest average rise time, a lowest summed rise time, or a lowest weighted summed rise time using the corresponding pair of the first average rise time value, the second average rise time value, the summed first rise time value, the summed second rise time value, the weighted summed first rise time value, or the weighted summed second rise time value, respectively.

Implementations of a system for sensing rotor position of a PMSM may include one, all, or any of the following:

The threshold voltage generator may be coupled to the controller and may be configured to generate the threshold voltage in response to a command from the controller. The threshold voltage may be one of a first threshold voltage and a second threshold voltage.

The first threshold voltage and the second threshold voltage may be calculated using a first threshold voltage equation or a second threshold voltage equation. The first threshold voltage equation may be $V_{th1}=(G)(R_{sh})(I_{th1})+V_{off}$. The second threshold voltage equation may be $V_{th2}=(G)(R_{sh})(I_{th2})+V_{off}$ where $V_{th1}$ is the first threshold voltage, $V_{th2}$ is the second threshold voltage, G is a gain of the amplifier, $R_{sh}$ is a resistance from the resistor, $I_{th1}$ is a first threshold current, $I_{th2}$ is a second threshold current, and $V_{off}$ is the amplifier's offset voltage.

The first threshold current and the second threshold current may be related by the equation $$I_{th1} = \frac{4}{3} I_{th2}.$$

The plurality of voltage vectors may be one of 12 and 24.

Implementations of a system for sensing rotor position of a permanent magnet synchronous motor (PMSM) may include: a controller which may be coupled with the PMSM. The controller may be configured to apply a plurality of voltage vectors to the PMSM to generate a plurality of sensing current signals from a stator of the PMSM in response. An amplifier may be coupled to the PMSM. The amplifier may be configured to receive and to amplify the plurality of the sensing current signals. An analog-to-digital (A/D) converter may be coupled to the amplifier. The A/D converter may be configured to convert the plurality of the sensing current signals into a plurality of digital current signals. The rise time measurement circuit may be coupled to the A/D converter and to a controller. The rise time measurement circuit may be configured to calculate a plurality of rise times in response to receiving a plurality of digital current signals from the A/D converter and a threshold A/D value from the controller. A memory may be coupled with the rise time measurement circuit. The memory may be configured to store the plurality of rise times. A rotor-angle estimation circuit may be coupled with the memory. The rotor-angle estimation circuit may be configured to identify from the plurality of rise times a shortest rise time and a voltage vector corresponding with the shortest rise time. The rotor-angle estimation circuit may identify at least two adjacent voltage vectors to the voltage vector with the shortest rise time. The rotor-angle estimation circuit may average, sum or weighted sum the rise times of the voltage vector corresponding with the shortest rise time and its at least two adjacent voltage vectors to form an average first rise time value, a summed first rise time value, or a weighted summed first rise time value, respectively. The rotor-angle estimation circuit may identify the voltage vector that is 180 degrees out of phase with the voltage vector corresponding to the shortest rise time. The rotor-angle estimation circuit may identify at least two adjacent voltage vectors to the voltage vector that is 180 degrees out of phase. The rotor-angle estimation circuit may average, sum, or weighted sum the rise times of the voltage vector that is 180 degrees out of phase and its at least two adjacent voltage vectors to form a second average rise time value, a summed second rise time value, or a weighted summed second rise time value, respectively. The rotor-angle estimation circuit may calculate a rotor position relative to the stator of the PMSM by determining a lowest average rise time, a lowest summed rise time, or a lowest weighed summed rise time using the corresponding pair of the first average rise time value, the second average rise time value, the summed rise time value, the summed second rise time value, the weighted summed first rise time value, or the weighted summed rise time value, respectively.

Implementations of a system for sensing rotor position of a PMSM may include one, all, or any of the following:

The controller may be configured to generate a first threshold current and a second threshold current. The first threshold current and the second threshold current may be related by the equation $$I_{th1} = \frac{4}{3} I_{th2},$$

where $I_{th1}$ is the first threshold current and $I_{th2}$ is the second threshold current.

The controller may be configured to generate a first A/D threshold value and a second A/D threshold value using a first A/D threshold value equation or a second A/D threshold value equation. The first A/D threshold value equation may be $$AD_{th1} = V_{th1}\left(\frac{2^n}{Vref_{AD}}\right)$$

and the second A/D threshold value equation may be $$AD_{th2} = V_{th2}\left(\frac{2^n}{Vref_{AD}}\right)$$

where $AD_{th1}$ is the first A/D threshold value, $AD_{th2}$ is the second A/D threshold value, $V_{th1}$ is a first threshold voltage, $V_{th2}$ is a second threshold voltage, n is the A/D resolution, and $Vref_{AD}$ is a full scale voltage value.

The rise time measurement circuit may measure each rise time using a rise time measurement equation. The rise time measurement equation may be $$T_r = \left(\frac{AD_{th} - AD_1}{AD_2 - AD_1}\right)(t_2 - t_1) + t_1$$

where $T_r$ is the rise time, $AD_{th}$ is one of the first A/D value threshold and the second A/D value threshold, $AD_2$ is a first value from the A/D converter formed when $AD_2$ exceeds $AD_{th}$, $AD_1$ is a second value from the A/D converter formed prior to $AD_1$ exceeding $AD_{th}$, $t_2$ is a time corresponding with $AD_2$, and $t_1$ is a time corresponding with $AD_1$.

The plurality of voltage vectors may be one of 12 and 24.

Implementations of a method for sensing rotor position of a permanent magnet synchronous motor (PMSM) may include applying a plurality of voltage vectors to a stator of a PMSM. The method may include generating a plurality of sensing current signals from the stator in response to the plurality of voltage vectors applied to the PMSM. The plurality of sensing current signals may be converted into a plurality of sensing voltage signals using a resistor coupled to the stator. The method may include amplifying the plurality of sensing voltage signals using an amplifier coupled to the resistor. Each of the amplified plurality of sensing voltage signals may be compared with a threshold voltage generated by a threshold voltage generator using a comparator coupled to the amplifier. The method may include calculating a plurality of rise times using the amplified plurality of sensing voltage signals and a signal from the comparator using a rise time measurement circuit coupled to the comparator. The method may include storing the plurality of rise times in a memory coupled with the rise-time measurement circuit. The method of determining a rotor position relative to the stator of the PMSM may include using a rotor-angle estimation circuit by identifying from the plurality of rise times a shortest rise time and a voltage vector corresponding with the shortest rise time, identifying at least two adjacent voltage vectors to the voltage vector with the shortest rise time, and averaging, summing, or weighted summing the rise times of the voltage vector corresponding with the shortest rise time and its at least two adjacent voltage vectors to form an average first rise time value, a summed first rise time value, or a weighted summed first rise time value, respectively. The method may include using the rotor angle estimation circuit to determine the rotor position by identifying the voltage vector that is 180 degrees out of phase with the voltage vector corresponding to the shortest rise time, identifying at least two adjacent voltage vectors to the voltage vector that is 180 degrees out of phase, and averaging, summing, or weighted summing the rise times of the voltage vector corresponding with the voltage vector that is 180 degrees out of phase and its at least two adjacent voltage vectors to form a second average rise time value, a summed second rise time value, or a weighted summed second rise time value, respectively. The method may include calculating the rotor position relative to the stator by determining a lowest average rise time, a lowest summed rise time, or a lowest weighted summed rise time using the corresponding pair of the first average rise time value, the second average rise time value, the summed first rise time value, the summed second rise time value, the weighted summed first rise time value, or the weighted summed second rise time value, respectively.

Implementations of a method for sensing rotor position of a PMSM may include one, all, or any of the following:

Generating a threshold voltage may include using the threshold voltage generator in response to a command from the controller coupled with the threshold voltage generator. The threshold voltage may be generated as one of a first threshold voltage and a second threshold voltage.

Calculating the first threshold voltage and the second threshold voltage may include using a first threshold voltage equation or a second threshold voltage equation. The first threshold voltage equation may be $V_{th1}=(G)(R_{sh})(I_{th1})+V_{off}$. The second threshold voltage equation may be $V_{th2}=(G)(R_{sh})(I_{th2})+V_{off}$ where $V_{th1}$ is the first threshold voltage, $V_{th2}$ is the second threshold voltage, G is a gain of the amplifier, $R_{sh}$ is a resistance from the resistor, $I_{th1}$ is a first threshold current, $I_{th2}$ is a second threshold current, and $V_{off}$ is the amplifier's offset voltage.

Calculating the first threshold voltage and the second threshold voltage using a first threshold current and a second threshold current may include using a first threshold current and a second threshold current related by the equation $$I_{th1} = \frac{4}{3}I_{th2}.$$

Applying a plurality of voltage vectors may include applying one of 12 and 24 voltage vectors.

Implementations of a method for sensing rotor position of a permanent magnet synchronous motor (PMSM) may include applying a plurality of voltage vectors to a stator of a PMSM. The method may include generating a plurality of sensing current signals from the stator in response to the plurality of voltage vectors applied to the PMSM. The method may include amplifying the plurality of sensing current signals using an amplifier coupled to the PMSM. The amplified plurality of sensing current signals may be converted into a plurality of digital current signals using an analog to digital (A/D) converter coupled with the amplifier. The method may include calculating a plurality of rise times using a rise-time measurement circuit coupled to the A/D converter and to a controller, based upon the plurality of digital current signals received from the A/D converter and an A/D threshold value from the controller. The method may include storing the plurality of rise times in a memory coupled with the rise-time measurement circuit. The method may include determining a rotor position relative to the stator of the PMSM using a rotor-angle estimation circuit by identifying from the plurality of rise times a shortest rise time and a voltage vector corresponding with the shortest rise time, identifying at least two adjacent voltage vectors to the voltage vector with the shortest rise time, and averaging, summing, or weighted summing the rise times of the voltage vector corresponding with the shortest rise time and its at least two adjacent voltage vectors to form an average first rise time value, a summed first rise time value, or a weighted summed first rise time value, respectively. The method of determining the rotor position may include identifying the voltage vector that is 180 degrees out of phase with the voltage vector corresponding to the shortest rise time, identifying at least two adjacent voltage vectors to the voltage vector that is 180 degrees out of phase, and averaging, summing, or weighted summing the rise times of the voltage vector corresponding with the voltage vector that is 180 degrees out of phase and its at least two adjacent voltage vectors to form a second average rise time value, a summed second rise time value, or a weighted summed second rise time value. The method may include calculating the rotor position relative to the stator by determining a lowest average rise time, a lowest summed rise time, or a lowest weighted summed rise time using the corresponding pair of the first average rise time value, the second average rise time value, the summed first rise time value, the summed second rise time value, the weighted summed first rise time value, or the weighted summed second rise time value, respectively.

Implementations of a method for sensing rotor position of a PMSM may include one, all, or any of the following:

Generating a first threshold current and a second threshold current may include using the controller. The first threshold current and the second threshold current may be related by the equation $$I_{th1} = \frac{4}{3}I_{th2}$$

where $I_{th1}$ is the first threshold current and $I_{th2}$ is the second threshold current.

Measuring each rise time with the rise time measurement circuit may include using a rise time measurement equation. The rise time measurement equation may be $$T_r = \left(\frac{AD_{th} - AD_1}{AD_2 - AD_1}\right)(t_2 - t_1) + t_1$$

where $T_r$ is the rise time, $AD_{th}$ is one of the first A/D value threshold and the second A/D value threshold, $AD_2$ is a first value from the A/D converter formed when $AD_2$ exceeds $AD_{th}$, $AD_1$ is a second value from the A/D converter formed prior to $AD_1$ exceeding $AD_{th}$, $t_2$ is a time corresponding with $AD_2$, and $t_1$ is a time corresponding with $AD_1$.

Applying a plurality of voltage vectors may include applying one of 12 and 24 voltage vectors.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 7-8 are simplified equivalent inductance and impedance circuits of FIG. 5;

FIG. 9 is a graph with 12 voltage vectors plotted thereon;

DESCRIPTION

This disclosure, its aspects and implementations, are not limited to the specific components, assembly procedures or method elements disclosed herein. Many additional components, assembly procedures and/or method elements known in the art consistent with the intended rotor position sensing system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such rotor position sensing systems, and implementing components and methods, consistent with the intended operation and methods.

Figure 1:
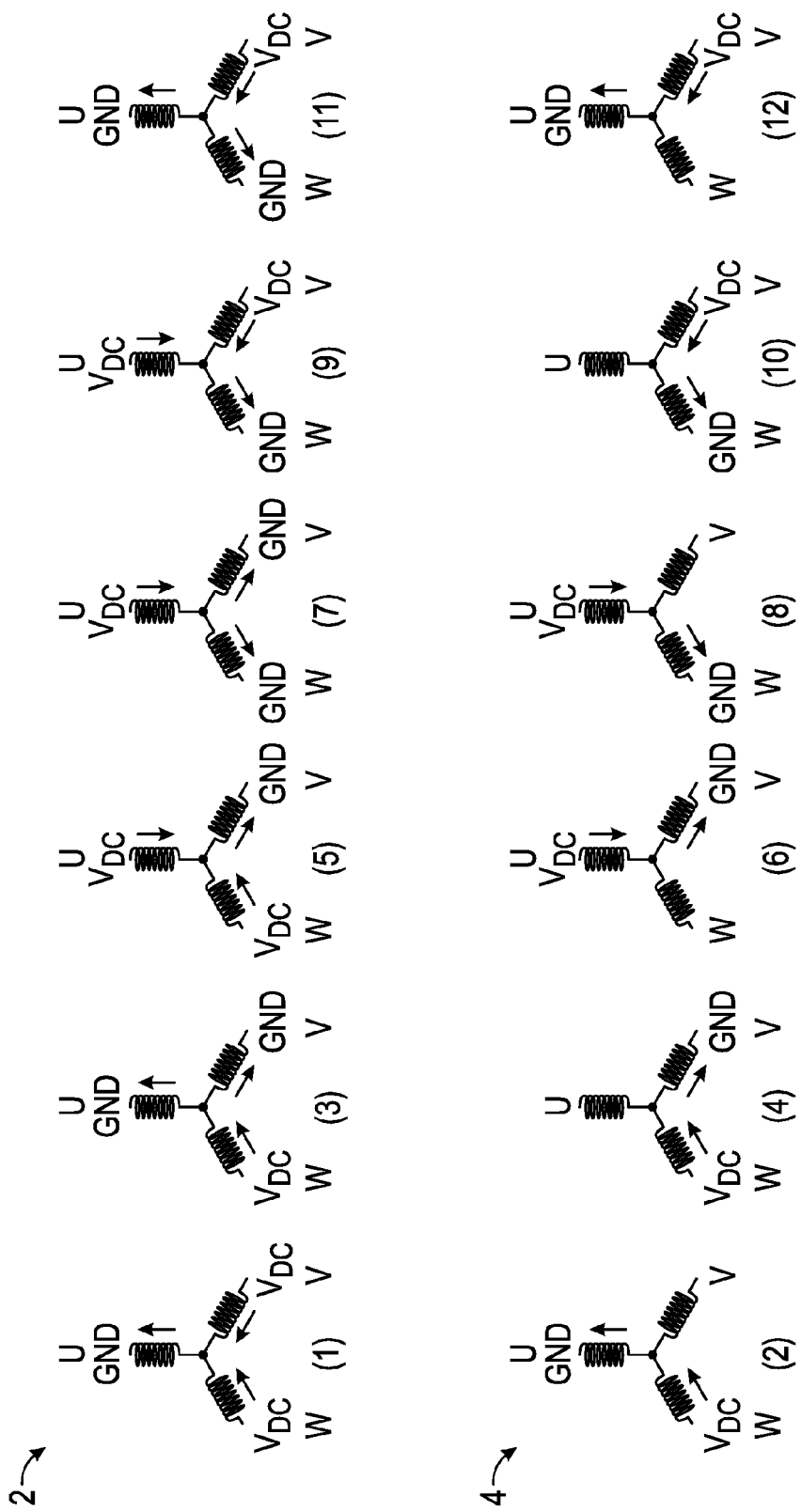
FIG. 1 is an illustration of two sets of voltage vectors.

Referring now to FIG. 1, two sets of voltage vectors are shown. In this implementation, the total twelve voltage vectors used in various system implementations disclosed herein are divided into two groups, 2, 4. Each voltage vector is labeled using a voltage vector reference labeled between (1) and (12). The twelve voltage vectors are applied to a permanent magnet synchronous motor (PMSM) during operation, and when they are applied, each voltage vector induces currents in the stator windings of the PMSM.

Figure 2:
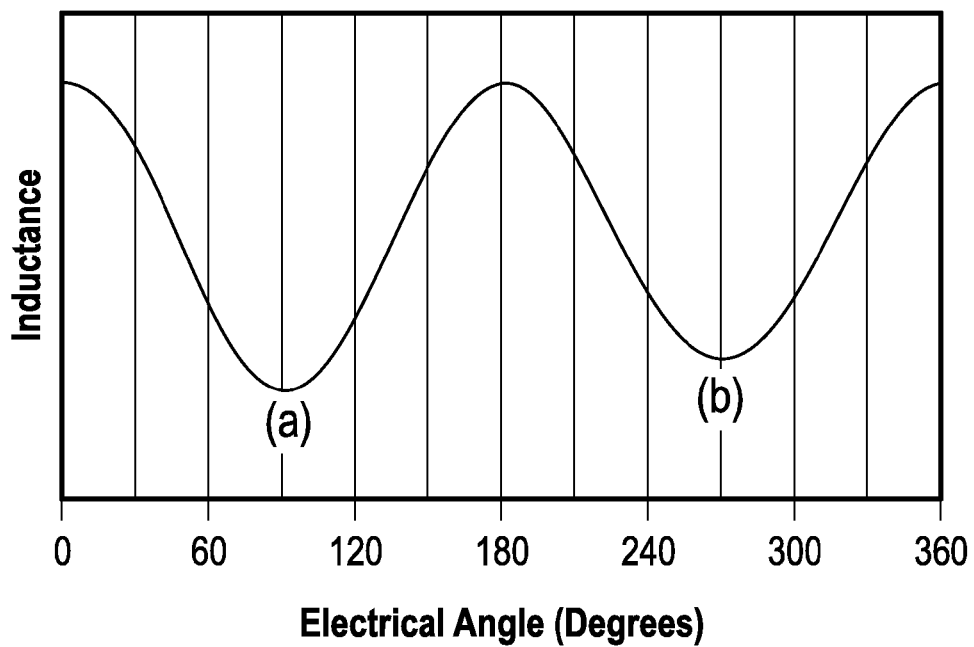
FIG. 2 is a graph illustrating the relation between the electrical angles of voltage vectors and resulting inductance.
Figure 3:
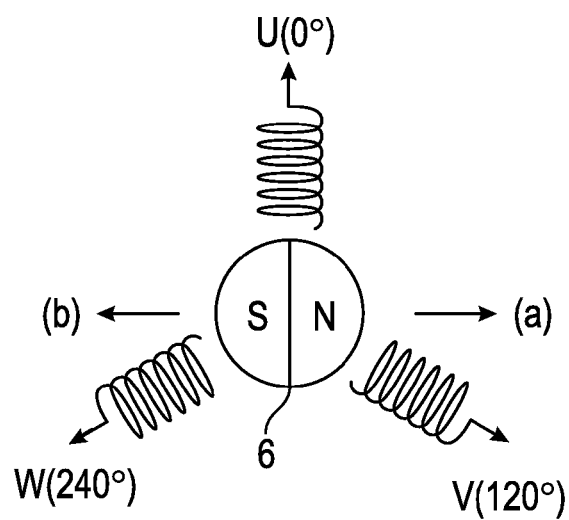
FIG. 3 is an illustration of a three phase PMSM.

FIG. 2 is a graph illustrating the relationship between the twelve voltage vectors' varying electrical angles and the inductance of the resulting induced current caused by each vector. FIG. 3 is a diagram of the stator windings represented by inductors for a three-phase PMSM. A voltage vector that is aligned with the north pole (a) of the magnetic rotor 6 corresponds with the value of the lowest inductance shown by point (a) in FIG. 2. A voltage vector aligned with the south pole (b) of the magnetic rotor 6 in FIG. 3 corresponds with the point (b) in FIG. 2. While voltage vectors that align with the north and south poles of the magnetic rotor 6 both result in low inductances, the lowest inductance value observed corresponds to the voltage vector most closely aligned with the north pole.

Figure 4A:
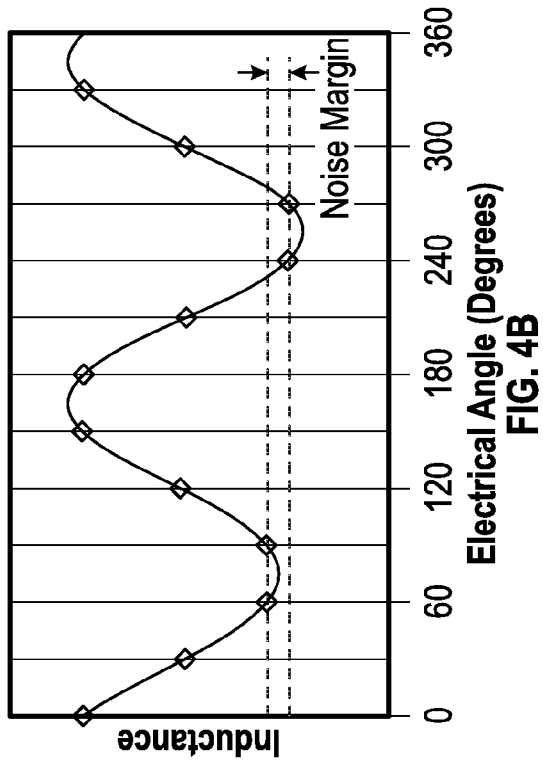
FIGS. 4A-4D are graphs of FIG. 2 with voltage vectors plotted thereon.
Figure 4B:
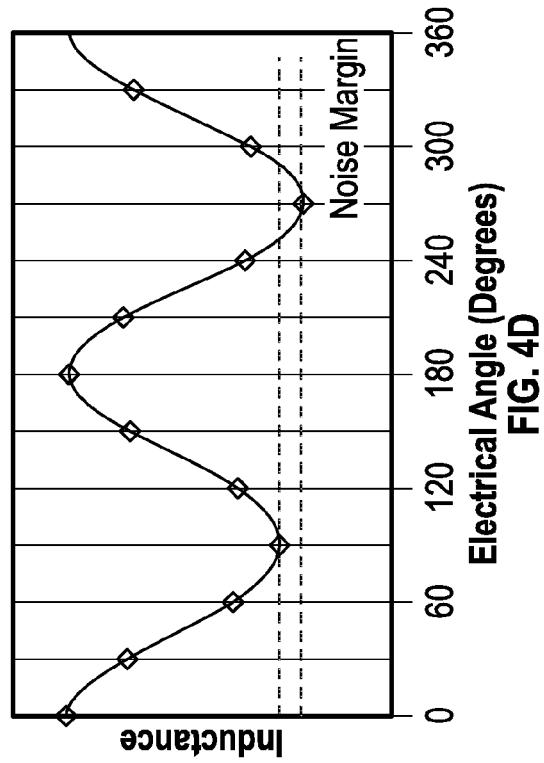
Figure 4C:
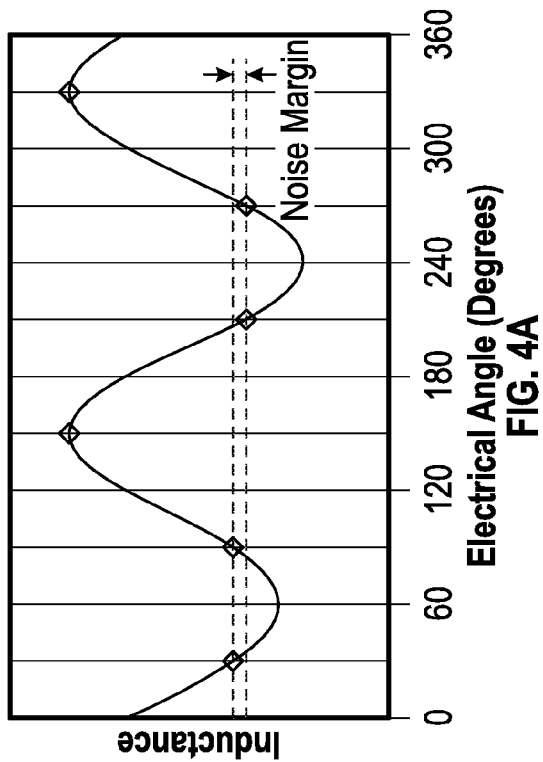
Figure 4D:
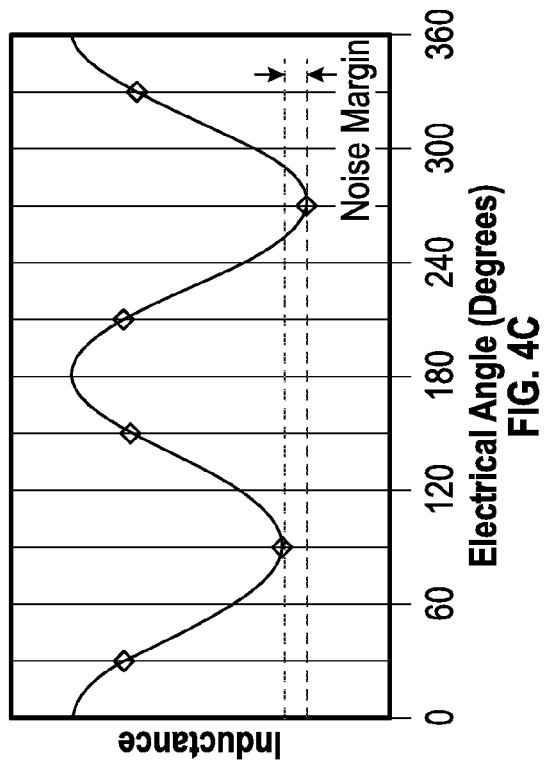

Referring to FIGS. 4A and 4C, the inductance induced after applying six voltage vectors to the stator windings of a PMSM in a worst case (FIG. 4A) and in a best case (FIG. 4C) situation is illustrated. As can be seen, in the worst case situation in FIG. 4A, the ability of the system to be able to find/estimate the electrical angle in degrees of the lowest inductance point is poor, as the data values corresponding with the vectors applied on the side of the curve around 60 degrees are only slightly higher in inductance than the data values corresponding with the vectors applied on the side of the curve around 240 degrees. Because of this, the noise margin, or the range of inductance values in which the system can detect the correct lowest possible inductance value in the midst of normal measurement noise, is narrow.

Where measurement noise causes the data values around 60 degrees to have basically the same inductance values as those around 240 degrees, the system would have no way of accurately calculating the lowest inductance value. Because of this, it is evident that merely using 6 voltage vector driven data points to try to identify the lowest inductance value can be problematic. Referring to FIGS. 4B and 4D, graphs of induced inductance values using twelve voltage vectors that correspond with the graphs in FIGS. 4A and 4C are illustrated. As before, FIG. 4B illustrates the worst case and FIG. 4D illustrates the best case. In the worst case, because of the increase in data points the noise margin can be observed to be larger, meaning that with 12 vectors, the increase in data gives the system a better chance of detecting/estimating the lowest inductance value. This is true even in the best case scenarios, where the system has actually identified the two absolute lowest inductance values using 6 vectors and using 12 vectors. This is because the additional data permits the system to more accurately know that the system has indeed found the lowest inductance point.

The importance of being able to find the lowest inductance point is important, because that lowest inductance point corresponds with an electrical angle value which corresponds with the physical position of the rotor of the PMSM. Knowing as accurately as possible the electrical angle value, then, permits the system to know as accurately as possible the physical position of the rotor at any given time.

Figure 5:
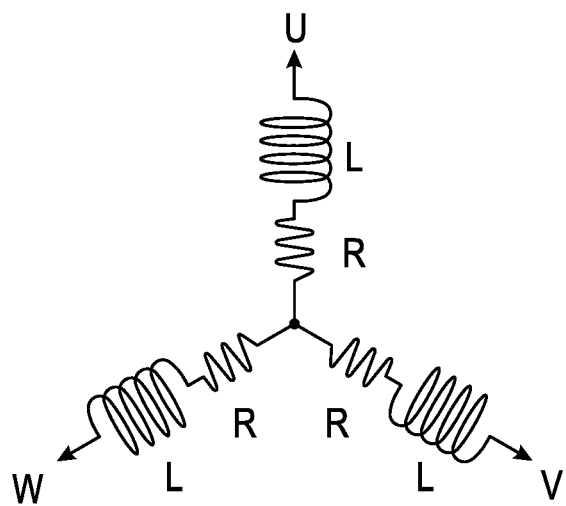
FIG. 5 is an illustration of an equivalent circuit of a three phase motor.
Figure 6:
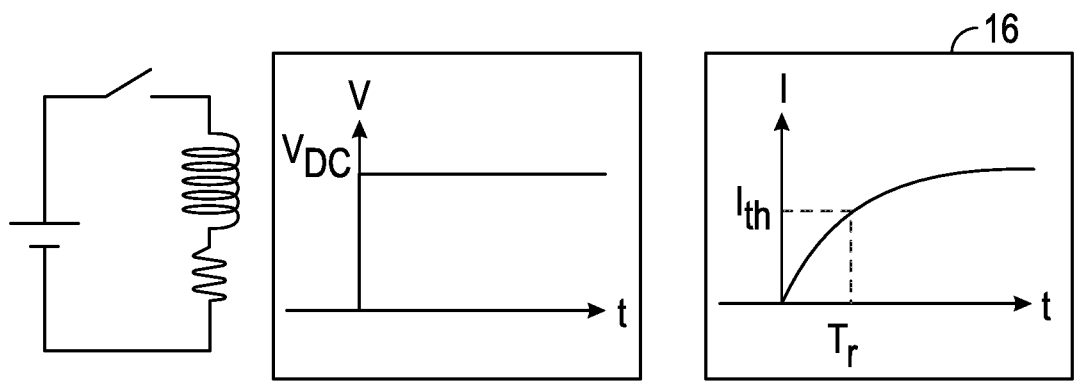
FIG. 6 is an illustration of the impulse response of an RL series circuit.

FIG. 5 is an illustration of a model of a circuit for a three phase motor. A PMSM can be modeled as a three-phase RL series circuit. FIG. 6 illustrates the equivalent circuit on the left and then graphs of the voltage (center) and current (right side) impulse response of the RL series circuit. Based on the equivalent circuit, the current as illustrated in FIG. 6 can be expressed as $$I = \frac{V_{DC}}{R}\left(1 - e^{-\frac{R}{L}t}\right) \qquad \text{Eq. 1}$$

where I represents the current, $V_{DC}$ represents the DC link voltage, R represents equivalent resistance corresponding to the applied voltage vectors, L represents the inductance, and t represents the time.

In graph 16 of FIG. 6, $T_r$ is the rise time, or the time until the current reaches a threshold value $I_{th}$. Thus, equation 1 can be rearranged and $T_r$ can be expressed as $$T_r = -\frac{L}{R}\ln\left(1 - \frac{RI_{th}}{V_{DC}}\right) \qquad \text{Eq. 2}$$

Equation 2 shows that Tr is proportional to L when R, V, and $I_{th}$ are constant. Therefore, if the lowest inductance can be detected from the current sensing signal, the lowest rise time can also be detected.

The equivalent circuit illustrated in FIG. 6 can be simplified to the equivalent inductance and impedance circuits illustrated in FIG. 7 and FIG. 8. FIG. 7 is an equivalent inductance and impedance circuit corresponding to the circuit encountered by voltage vectors of group 2 of FIG. 1 applied to a PMSM, expressed as equation 3, where $L_{eq1}$ is a first equivalent inductance, $L_1$ is a first inductance, $R_{eq1}$ is a first equivalent impedance, and R is an impedance.

$$L_{eq1} = \frac{3}{2}L_1, R_{eq1} = \frac{3}{2}R \qquad \text{Eq. 3}$$

FIG. 8 is the equivalent inductance and impedance circuit corresponding to the circuit encountered by voltage vectors of group 4 of FIG. 1 applied to a PMSM, expressed as equation 4, where $L_{eq2}$ is a second equivalent inductance, $L_2$ is a second inductance, $R_{eq2}$ is a second equivalent impedance, and R is an impedance.

$$L_{eq2} = 2L_2, R_{eq2} = 2R \qquad \text{Eq. 4}$$

When the rotor flux is ignored and $L_1$ equals $L_2$, the relationship between $L_{eq1}$ and $L_{eq2}$ is shown by equation 5.

$$L_{eq1} = \frac{3}{4}L_{eq2}, R_{eq1} = \frac{3}{4}R_{eq2} \qquad \text{Eq. 5}$$

If the rise time can be calculated by inserting the equivalent inductance and equivalent impedance values from equation 3 and 4 into equation 2, equations 6 and 7 result.

$$T_{r1} = -\frac{L_1}{R}\ln\left(1 - \frac{3/2RI_{th}}{V_{DC}}\right) \qquad \text{Eq. 6}$$

$$T_{r2} = -\frac{L_2}{R}\ln\left(1 - \frac{2RI_{th}}{V_{DC}}\right) \qquad \text{Eq. 7}$$

As can be seen by equations 6 and 7, the first rise time $T_{r1}$ and the second rise time $T_{r2}$ are not equal even when $L_1$ equals $L_2$. Therefore, a simple comparison of the value of $T_{r1}$ and $T_{r2}$ does not lead to a proper comparison of the value of $L_1$ and $L_2$, and in turn, does not indicate the rotor position of the PMSM. By using different current threshold values, however, this issue can be resolved.

If $I_{th1}$ is the current threshold used in association with the voltage vectors of group 2 from FIG. 1, and $I_{th2}$ is the current threshold used in association with the voltage vectors of group 4 from FIG. 1, a mathematical relationship between a first and second current threshold can be rewritten as equation 8.

$$I_{th1} = \frac{4}{3}I_{th2} \qquad \text{Eq. 8}$$

Substituting the relationship in equation 8, equations 6 and 7 can be rewritten as equations 9 and 10.

$$T_{r1} = -\frac{L_1}{R}\ln\left(1 - \frac{\frac{3}{2}RI_{th1}}{V_{DC}}\right) = \qquad \text{Eq. 9}$$
$$-\frac{L_1}{R}\ln\left(1 - \frac{\frac{3}{2}R\frac{4}{3}I_{th2}}{V_{DC}}\right) = -\frac{L_1}{R}\ln\left(1 - \frac{2RI_{th2}}{V_{DC}}\right)$$

$$T_{r2} = -\frac{L_2}{R}\ln\left(1 - \frac{2RI_{th2}}{V_{DC}}\right) \qquad \text{Eq. 10}$$

By varying the threshold currents, the rise times corresponding to all voltage vectors in both groups can now be compared on a same basis, permitting detection of the lowest inductance value through using the rise times of each voltage vector. Equations 9 and 10 may be used to confirm that the rise times are proportional to the coil inductances of each voltage vector by ensuring that the proper current threshold is selected.

Figure 10:
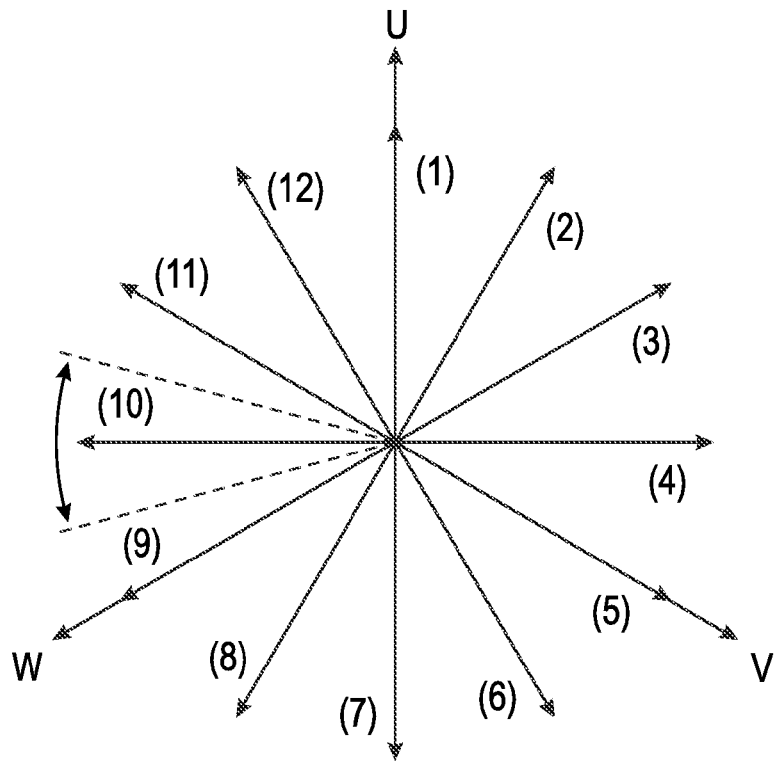
FIG. 10 is a representation of the relation of the plotted voltage vectors of FIG. 9 with the rotor position of a PMSM.

FIG. 9 represents a graph of the relationship between the rise times and the corresponding electrical angles of twelve voltage vectors for a particular implementation of a PMSM. FIG. 10 is a representation of how the plotted voltage vectors of FIG. 9 would relate to rotor position of a PMSM. The voltage vector (10) with the lowest rise time in FIG. 9 corresponds to the position of the north pole of the PMSM within about 30 degrees as illustrated by the vector diagram of FIG. 10.

Figure 11:
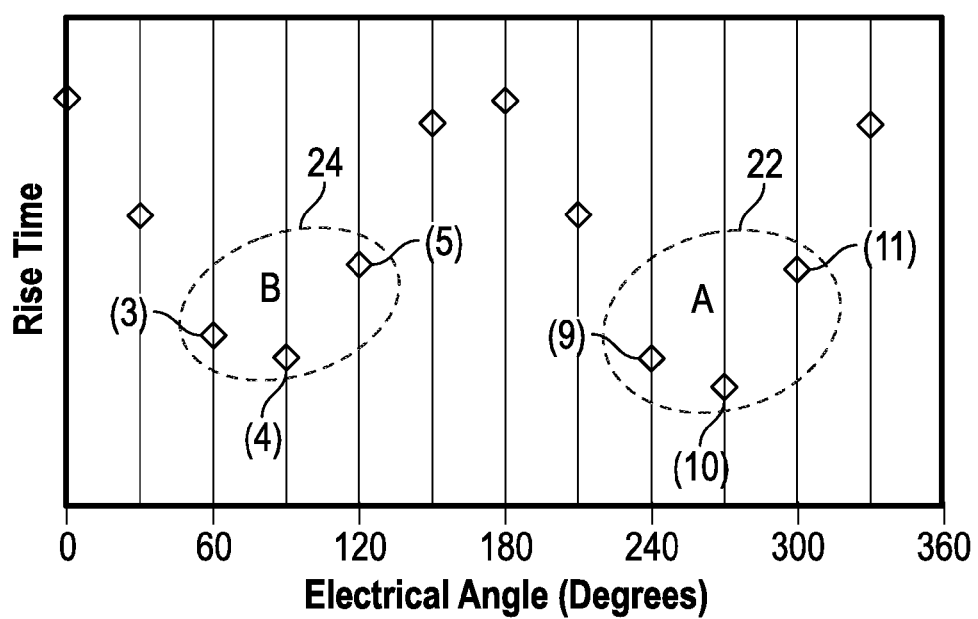
FIG. 11 is a graph of the plotted voltage vectors of FIG. 9 with short-rise-time voltage vectors grouped together.
Figure 12:
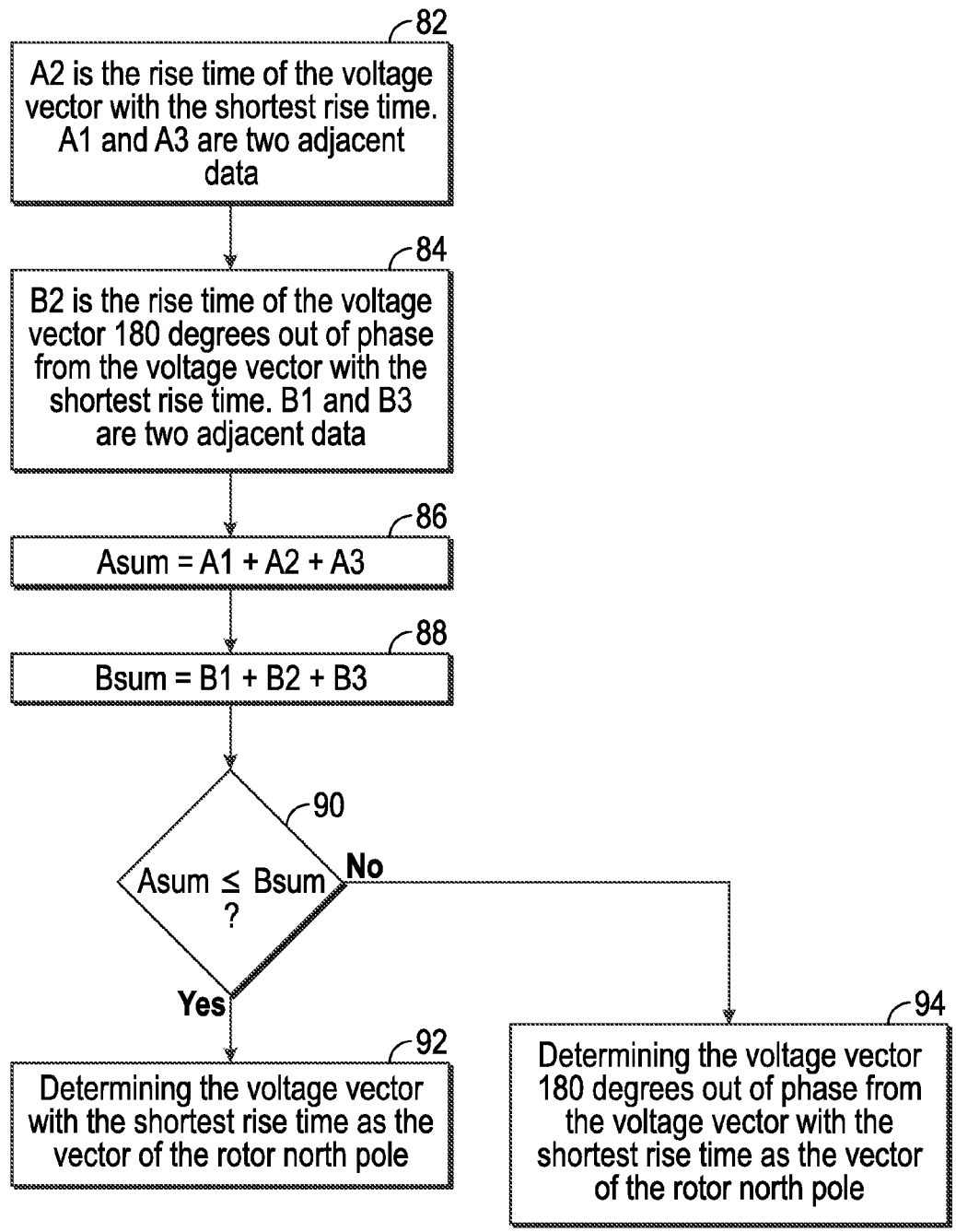
FIG. 12 is a flow chart showing the use of summed data to calculate rotor position.

To gain more noise immunity when using the vector data to find the lowest rise time, it is effective to use averaged data or summed data when determining the rotor position of a PMSM. FIG. 11 is a graph of the plotted voltage vectors of FIG. 9 with voltage vectors combined together to form groups 22 and 24. FIG. 12 is a flow chart of an implementation of determining the rotor position using summed data. As indicated by block 82 in FIG. 12, the shortest measured rise time, A2 corresponding with voltage vector (10) of FIG. 11 in this implementation, is summed with adjacent rise time values A1 and A3, corresponding with voltage vectors (9) and (11) of FIG. 11, as indicated by block 86 of FIG. 12. As indicated by block 84 of FIG. 12, B2 is the rise time of the voltage vector 180 degrees out of phase from the voltage vector with the shortest measured rise time. In the implementation illustrated by FIG. 11, voltage vector (4) is the voltage vector 180 degrees out of phase from the voltage vector with the shortest measured rise time (10). In this implementation B2 is summed with rise times B1 and B3 corresponding with voltage vectors (3) and (5) of FIG. 11, as indicated by block 88 of FIG. 12. By comparing the sum of the rise time values of group 22 with the sum of the rise time values of group 24 as indicated by block 90, the true lowest rise time may be determined. If the sum of group 22, Asum, is less than the sum of group 24, Bsum, then the voltage vector with the shortest measured rise time is the vector correlating with the north pole of the rotor as indicated by block 92 of FIG. 12. If on the other hand the sum of group 24, Bsum, is less than the sum of group 22, Asum, then the voltage vector that is 180 degrees out of phase from the voltage vector with the shortest measured rise time represents the north pole of the rotor as indicated by block 94.

Figure 13:
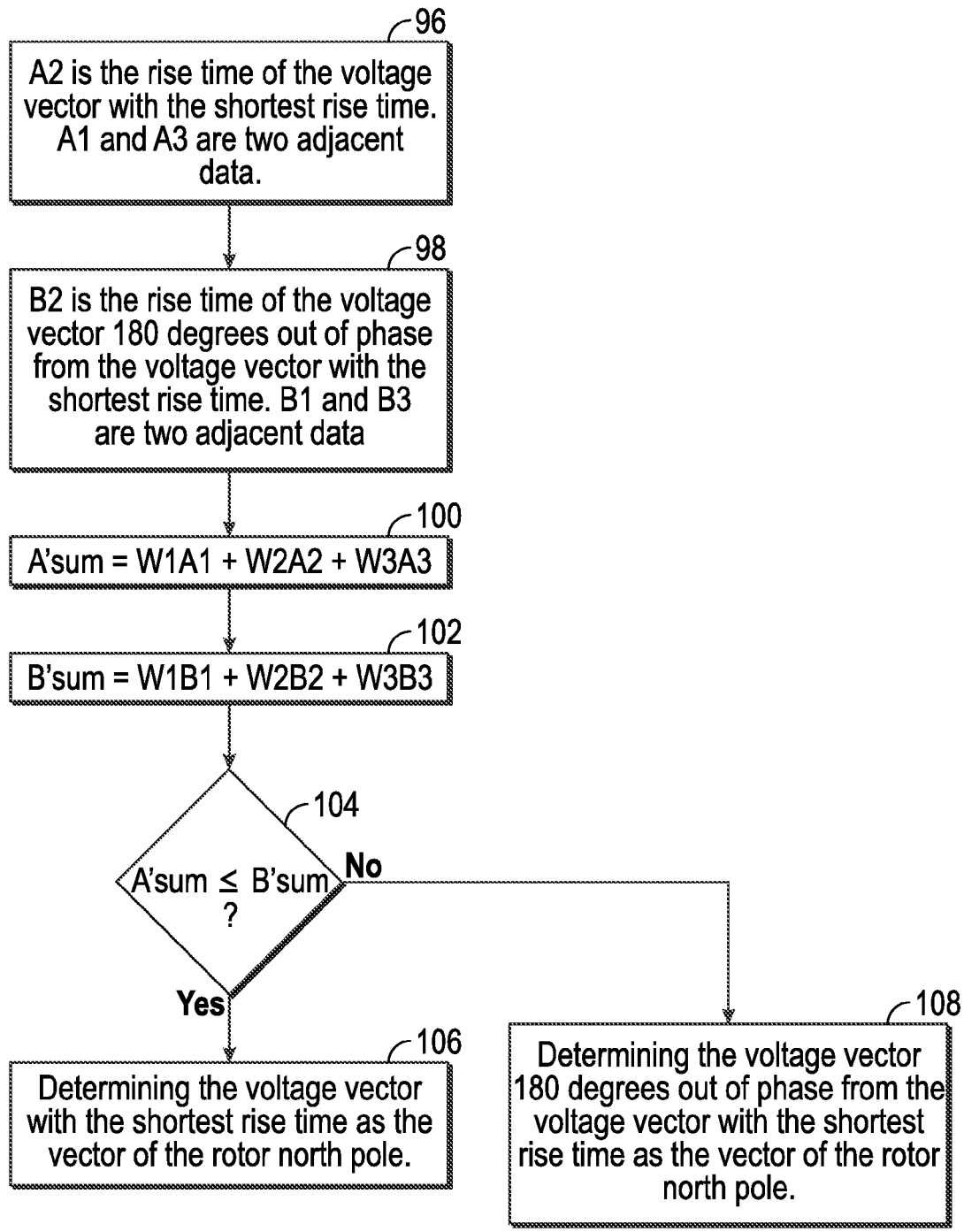
FIG. 13 is a flow chart showing the use of summed data using weighted coefficients to calculate rotor position.

FIG. 13 is a flowchart of another implementation similar to the implementation illustrated in FIG. 12, however, weighted coefficients, as indicated by blocks 100 and 102 of FIG. 13, are used to determine the true shortest rise time of the voltage vectors.

In still other implementations, averaged data may be used to calculate the shortest rise time. The average data to be compared can be expressed as equation 11, where $A_{ave}$ is the average first rise time value, $A_1$-$A_3$ are the rise times of the voltage vector with the shortest rise time and its two adjacent voltage vectors, and $B_{ave}$ is the average second rise time value and $B_1$-$B_3$ are the rise times of the voltage vectors 180 degrees out of phase from the voltage vector with the shortest rise time and its two adjacent voltage vectors.

$$A_{ave} = \frac{(A_1 + A_2 + A_3)}{3}, B_{ave} = \frac{(B_1 + B_2 + B_3)}{3} \qquad \text{Eq. 11}$$

By comparing $A_{ave}$ with $B_{ave}$ in a similar manner as the summed data was compared in FIGS. 12 and 13, the rotor position may be determined. If $A_{ave}$ is less than $B_{ave}$, then the shortest measured rise time out of $A_1$-$A_3$ represents the north pole of the rotor. If $B_{ave}$ is less than $A_{ave}$, then the rise time 180 degrees out of phase from the shortest measured rise time represents the north pole of the rotor.

In alternative implementations, averaged data may be used by comparing the average of the rise time values of group 22 with the average of the rise time value corresponding with voltage vector (10) and with adjacent rise time values corresponding with voltage vectors (9) and (11), the fact that the rise time value corresponding with voltage vector (10) is the lowest rise time value can be confirmed. In various implementations, the rise time value corresponding with voltage vector (10) is then compared with the value of the rise time corresponding with a voltage vector in group 24 that is 180 degrees out of phase from the rise time value corresponding to voltage vector (10). Similarly, the lowest rise time value in group 24 is determined by comparing the average of the shortest rise time value of group 24 with the rise time value 180 degrees out of phase (rise time value corresponding with voltage vector (4)) and with the two adjacent rise time values corresponding with voltage vectors (3) and (5). If using the averaging process and the subsequent 180-degree comparison process, the rise time value corresponding to voltage vector (10) indeed represents the lowest rise time value, the position of the north pole of the magnet of the rotor has been identified.

In various implementations, more than two adjacent voltage vectors may be included in the analysis in each group. In such implementations, the adjacent voltage vectors would include those close to and not just next to the point of interest.

Figure 14:
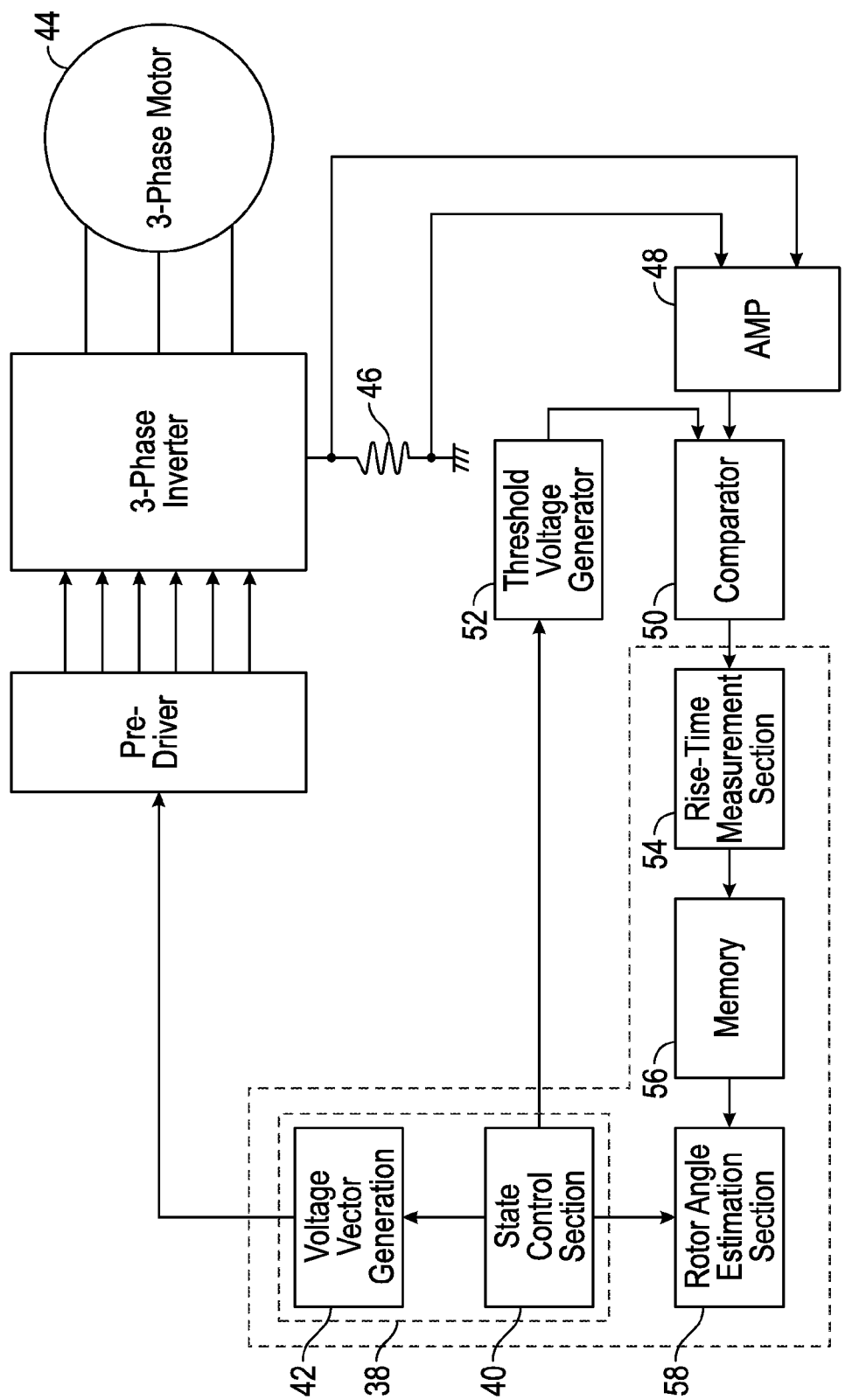
FIG. 14 is a block diagram of a first implementation of a system for sensing the rotor position of a PMSM.

Referring now to FIG. 14, a block diagram of a first implementation of a system for sensing a rotor position of a PMSM is illustrated. In this implementation, a controller 38 may include a state control circuit 40 and a voltage vector generator 42 operatively coupled together. The controller 38 is coupled with a PMSM 44.

The controller 38 is designed to generate a plurality of voltage vectors which may be applied to the PMSM 44, including the twelve voltage vectors used for position sensing. In a particular implementation, twelve out-of-phase voltage vectors are generated, however, in various implementations twenty-four or additional numbers of voltage vectors may be applied to the PMSM 44. In response to the voltage vectors applied to the stator windings of the PMSM 44, a plurality of current sensing signals is generated.

A resistor 46 may be coupled with the stator windings PMSM 44, which may be a shunt resistor in various implementations. The resistor 46 may be configured to receive a plurality of current sensing signals and then generate a corresponding plurality of sensing voltage signals. As illustrated, an amplifier 48 is coupled with the resistor 46 which is designed to receive and to amplify the plurality of sensing voltage signals for subsequent analog processing The signals from the amplifier 48 are then received by a comparator 50 coupled to the amplifier 48 and to a threshold voltage generator, 52. The comparator 50 receives and compares each sensing voltage signal from the amplifier 48 with a threshold voltage value from the threshold voltage generator 52.

The threshold voltage generator 52 is coupled with the controller 38 and/or with the state control circuit 40 within the controller, and the controller and/or state control circuit 40 determines when and what threshold voltage is generated by the threshold voltage generator 42. The threshold voltage generator 42 may generate a single or multiple threshold voltage values, including 1, 2, 6, 12, or 24 threshold voltage values, depending on the specific implementation and logic circuitry used in the comparator 50 itself. Because different voltage vectors applied to the PMSM 44 may result in different equivalent inductances, and because different equivalent inductances affect the rise time as shown in equations 1 and 2, the controller may adjust the threshold voltage to be produced based upon the particular voltage vector just applied to the PMSM 44. This allows the magnitudes of the rise times corresponding to all the voltage vectors to then be compared on an equivalent basis. In this specific implementation, one of two threshold voltages are produced and can be calculated using equation 12 or equation 13

$$V_{th1} = (G)(R_{sh})(I_{th1}) + V_{off} \qquad \text{Eq. 12}$$

$$V_{th2} = (G)(R_{sh})(I_{th2}) + V_{off} \qquad \text{Eq. 13}$$

where $V_{th1}$ is the first threshold voltage, $V_{th2}$ is the second threshold voltage, G is a gain of the amplifier, $R_{sh}$ is a resistance from the resistor, $I_{th1}$ is a first threshold current, $I_{th2}$ is a second threshold current, and $V_{off}$ is the amplifier's offset voltage. The first threshold current and the second threshold current are related by equation 8.

Figure 15:
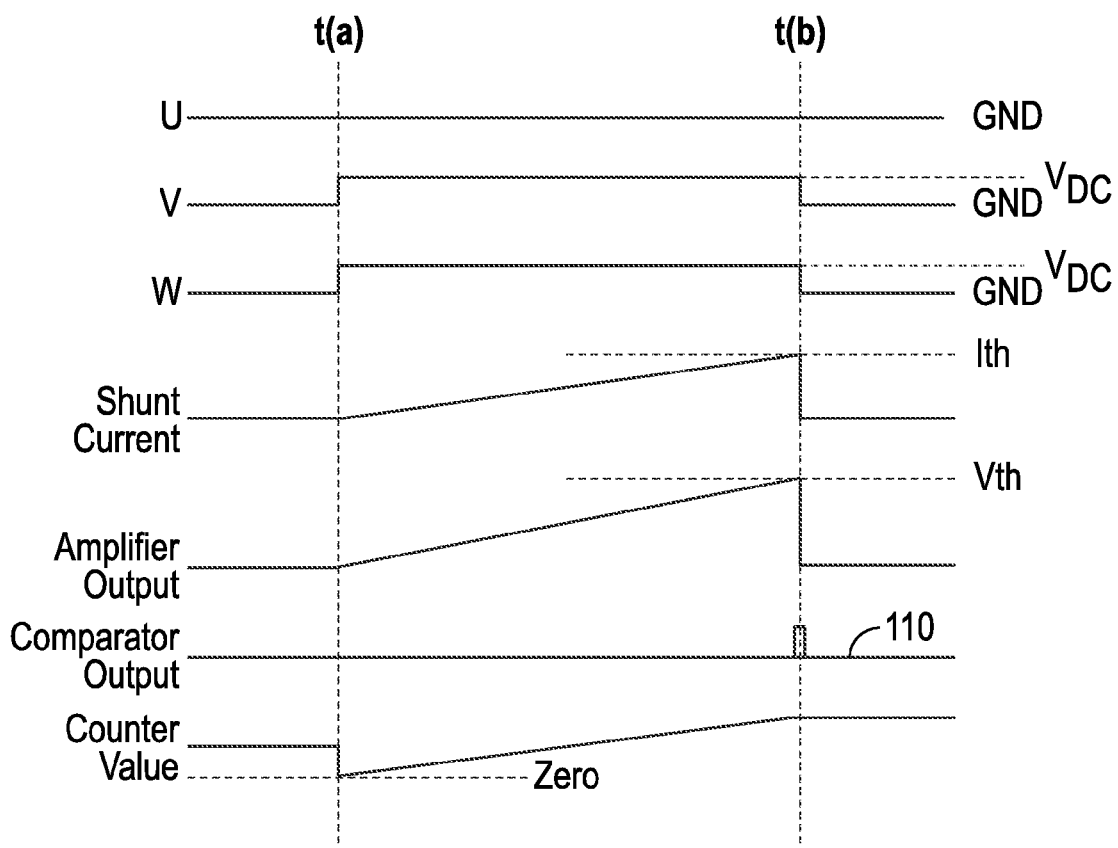
FIG. 15 is a waveform diagram of the circuit represented in FIG. 14.

A rise time measurement circuit 54 is coupled with the comparator 50. The rise time measurement circuit 54 calculates a plurality of rise times using the plurality of amplified sensing voltage signals and a counter. FIG. 15 is a waveform diagram of the circuit shown in FIG. 14. A voltage vector is applied by the controller at time $t_a$. At $t_a$, the counter value drops to zero and begins to rise as does the shunt current and the amplifier output. The comparator compares the amplifier output to the threshold voltage $V_{th}$. At time $t_b$ the amplifier output is the same as the voltage of $V_{th}$ and the comparator triggers the end of applying the voltage vector and the counter is stopped, as indicated by 110 in FIG. 15. The counter value at 110 is the rise time of the voltage vector applied. The counter is then reset to measure the next voltage vector applied by the controller 38.

A memory 56 is coupled to the rise time measurement circuit 54 in order to store the plurality of rise times calculated by the rise time measurement circuit 54. The memory may be any device or circuit for data storage.

A rotor-angle estimation circuit 58 is coupled with the memory 56. The rotor-angle estimation circuit 58 determines the rotor position of the PMSM 44 by identifying from the plurality of rise times in the memory 56 the voltage vector with the shortest rise time among the plurality of rise time values stored in the memory 56. In other implementations, the rotor-angle estimation circuit 58 may determine the rotor position of the PMSM 44 by using averaged data, summed data, or summed data using weighted coefficients as previously disclosed in this document. The rotor-angle estimation circuit 58 is coupled with a controller 38 and communicates the rotor position of the PMSM 44 to the controller 38.

In various implementations, a microprocessor may be included in the system which may include the rotor-angle estimation circuit 58. In particular implementations, the microprocessor may also include the controller 38. In these implementations, much of the functions of the various components of the system may be implemented using the microprocessor and/or as part of the microprocessor. In other various implementations, the rotor-angle estimation circuit 58 may include a plurality of logic circuits which act to carry out all of the functions of the various components of the system without including a microprocessor.

Figure 16:
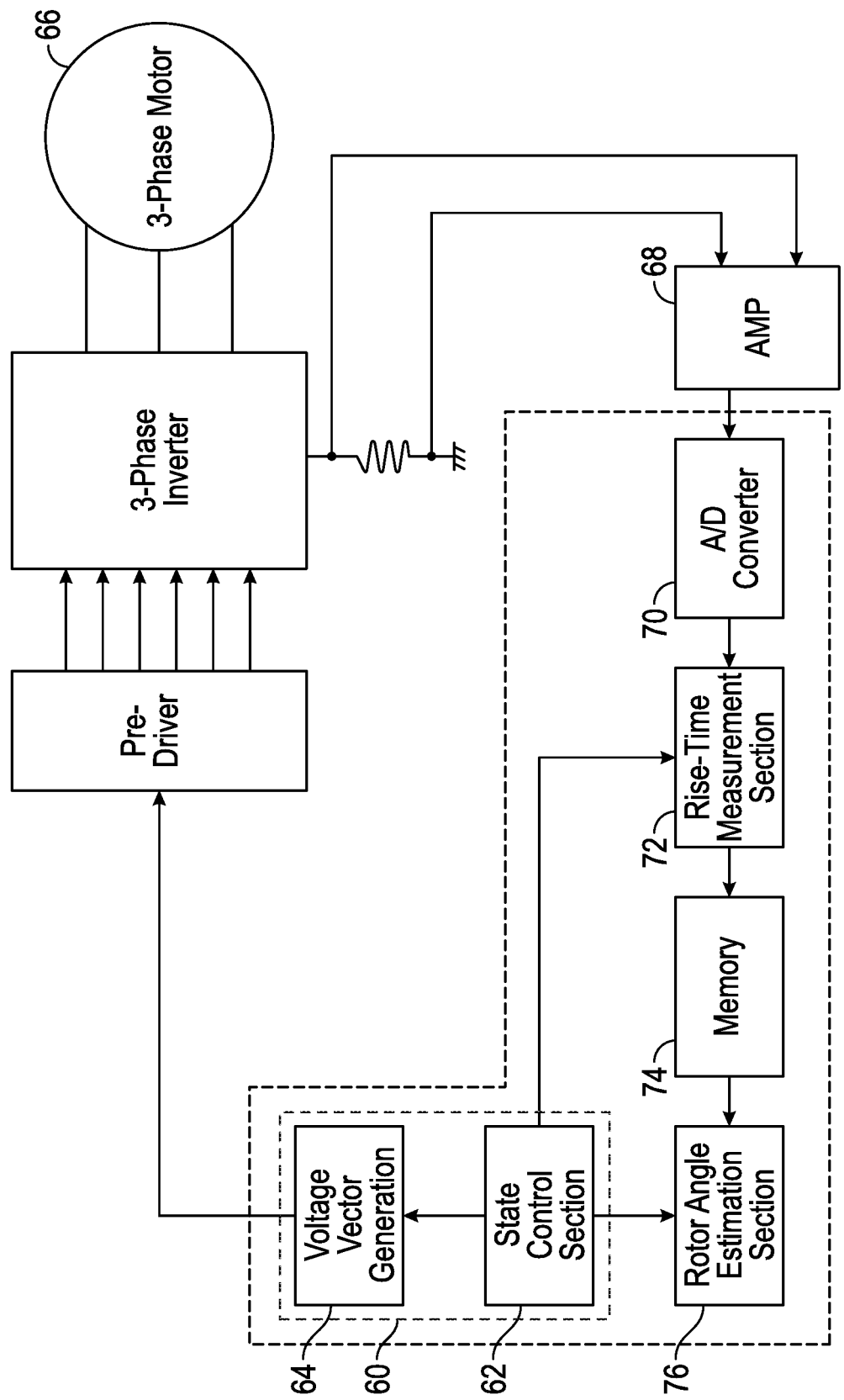
FIG. 16 is a block diagram of an implementation of a system for sensing the rotor position of a PMSM.

Referring now to FIG. 16, a block diagram of another implementation of a system for sensing a rotor position of a PMSM is illustrated. In this implementation, a controller 60 includes a state control circuit 62 and a voltage vector generator 64. The controller 60 is coupled with a PMSM 66 and is configured to generate a plurality of voltage vectors which are applied to the PMSM 66. In a particular implementation, twelve out-of-phase voltage vectors are generated, however, in various implementations, twenty-four or more voltage vectors may be applied to the PMSM 66. In response to the voltage vectors applied to the stator windings of the PMSM 66, a plurality of current sensing signals is produced similarly to the implementation illustrated in FIG. 14

An amplifier 68 is coupled with the resistor that generates the current sensing signals from the stator coils of the PMSM 66. The amplifier 68 receives and amplifies the plurality of sensing current signals and routes the plurality of amplified sensing current signals to an analog-to-digital (A/D) converter 70. The A/D converter 70 then converts the plurality of sensing current signals into a plurality of digital current signals.

A rise-time measurement circuit 72 is coupled with the A/D converter 70, to a controller 60, and/or to a state control circuit 62 within the controller 60. The rise-time measurement circuit 72 calculates a plurality of rise times in response to receiving the plurality of digital current signals from the A/D converter 70 using an A/D threshold value. In this implementation, there are two A/D threshold values that may be used as calculated by equations 14 and 15

$$AD_{th1} = V_{th1}\left(\frac{2^n}{Vref_{AD}}\right) \quad \text{Eq. 14}$$

$$AD_{th2} = V_{th2}\left(\frac{2^n}{Vref_{AD}}\right) \quad \text{Eq. 15}$$

where $AD_{th1}$ is the first A/D threshold value, $AD_{th2}$ is the second A/D threshold value, $V_{th1}$ is a first threshold voltage, $V_{th2}$ is a second threshold voltage, n is the A/D resolution, and $Vref_{AD}$ is a full scale voltage value. The calculation of the first and second threshold voltages are shown in equations 12 and 13. The values of the threshold voltages are determined by the values of the threshold currents. The relationship between the first and second threshold currents is shown in equation 8.

Figure 17:
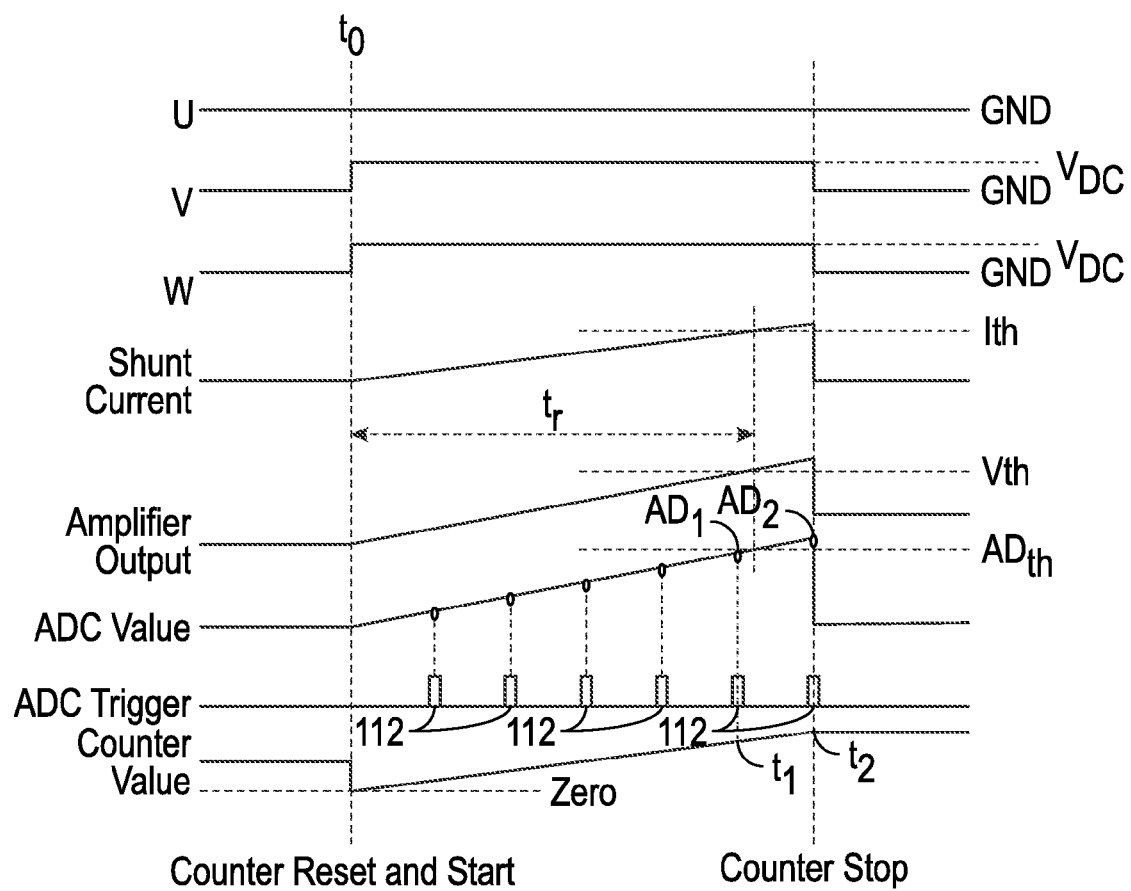
FIG. 17 is a waveform diagram of the circuit represented in FIG. 16.

FIG. 17 is a waveform diagram of the circuit of FIG. 16. FIG. 17 illustrates how the rise times are measured in one implementation. A voltage vector is applied by the controller at time $t_0$. Once the voltage vector is applied, the rise-time measurement circuit signals to start the A/D converter (70).

The A/D converter begins to generate sensing current signals 112. When a sensing current signal exceeds the value of the A/D threshold value ($AD_{th}$), as indicated by digital current signal $AD_2$, the voltage vector is no longer applied. This occurs at time $t_2$. The rise time measurement section then uses four data to calculate the rise time $T_r$ as shown in equation 16

$$T_r = \left(\frac{AD_{th} - AD_1}{AD_2 - AD_1}\right)(t_2 - t_1) + t_1 \quad \text{Eq. 16}$$

where $T_r$ is the rise time. $AD_{th}$ is one of the first A/D value threshold and the second A/D value threshold, $AD_2$ is a first digital current signal formed when $AD_2$ exceeds $AD_{th}$. $AD_1$ is a second digital current signal immediately preceding $AD_1$ at time $t_1$, $t_2$ is a time corresponding with $AD_2$, and $t_1$ is a time corresponding with $AD_1$.

In various implementations the controller 60 may generate a single or multiple threshold current values, including 1, 2, 6, 12, or 24 threshold current values. The number of threshold voltages and A/D threshold values correspond with the number of threshold current values generated. Because different voltage vectors applied to the PMSM may result in different equivalent inductances, and because different equivalent inductances affect the rise time as shown in equations 1 and 2, the controller 60 may adjust the threshold current to be produced based upon the particular voltage vector just applied to the PMSM 66. This process of varying the threshold current value allows the rise times corresponding to all the voltage vectors to be compared on a same basis. In this specific implementation two threshold currents are produced by the controller 60 and are related by equation 8. To ensure the rise times are proportional to the coil inductances of resulting from the applied voltage vectors, equations 9 and 10 may be used to confirm that the correct current threshold value was used and that the rise times are in fact proportional to the coil inductances.

Referring back to FIG. 16, a memory 74 is coupled to the rise time measurement circuit 72 and stores the plurality of rise times measured by the rise time measurement circuit 72. The memory may be any disclosed in this document. A rotor-angle estimation circuit 76 is coupled with the memory 74. The rotor-angle estimation 76 circuit determines the rotor position of the PMSM 66 by identifying the voltage vector with the shortest rise time among the plurality of rise time values stored in the memory 74. In other implementations, the rotor-angle estimation circuit 76 may determine the rotor position of the PMSM 66 by using averaged data, summed data, or summed data using weighted coefficients as disclosed in this document. The rotor-angle estimation circuit 76 may also be coupled with a controller 60. The rotor-angle estimation circuit 76 may communicate the rotor position of the PMSM 66 to the controller 60.

In various implementations, the state control section 62, the rotor-angle estimation section 76, the memory 74, the rise time measurement circuit 72, and the A/D converter 70 may all be included in a microcomputer and their functions carried out on the microcomputer entirely. In other implementations, only portions of their functions may be carried out using the microcomputer.

A method for sensing a rotor position of a PMSM may be used by various implementations of systems for sensing the rotor position of a PMSM. The method may include applying a plurality of voltage vectors to stator of a PMSM. In this implementation, twelve voltage vectors are applied, however, in other implementations 6, 24, or any other number of voltage vectors may be applied to the stator of the PMSM. The method includes generating a plurality of sensing current signals from the stator in response to the voltage vectors applied to the PMSM. The method also includes converting the sensing current signals into a plurality of sensing voltage signals using a resistor coupled to the stator, which may be a shunt resistor in particular implementations. The method includes amplifying the plurality of sensing voltage signals using an amplifier coupled with the resistor and comparing each of the plurality of sensing voltage signals to a threshold voltage generated by a threshold voltage generator using a comparator coupled with the amplifier. In various method implementations, there may be a single threshold voltage or multiple threshold voltages, including 2, 6, 12, or 24 threshold voltages. In particular implementations, there is a threshold voltage that corresponds with each sensing voltage signal. The two threshold voltage sensing signals may be related by equations 12 and 13, with the first and second threshold currents related by equation 8. The method may include generating the threshold voltage in response to receiving a command from the controller to the threshold voltage generator. In other implementations, the controller itself generates the threshold voltage.

The method includes calculating a plurality of rise times using the amplified plurality of sensing voltage signals and a signal from the comparator using a rise-time measurement circuit coupled to the comparator. The rise time measurement circuit may calculate a plurality of rise times using the plurality of amplified sensing voltage signals and a counter. The method may include starting a counter when a voltage vector is applied by the controller, and stopping the counter when the sensing voltage signal is the same as the threshold voltage signal. The method includes resetting the counter to measure the rise time of the next voltage vector applied.

The method includes storing the rise times in a memory which may be coupled with the rise time measurement circuit.

The method of determining a rotor position relative to the stator of a PMSM may be determined using a rotor-angle estimation circuit. The rotor-angle estimation circuit may determine the rotor position by identifying a voltage vector with the shortest rise time from the plurality of applied voltage vectors. In other implementations, the rotor-angle estimation circuit may determine the rotor position by using averaged data, summed data, or summed data using weighted coefficients as previously disclosed in this document.

The method also includes communicating the rotor position to the controller by the rotor-angle estimation circuit.

In another implementation of a method for sensing a rotor position of a PMSM, a plurality of voltage vectors is applied to stator of a PMSM. In this implementation, twelve voltage vectors are applied, however, in other implementations 6, 24, or any other number of voltage vectors may be applied to the stator of the PMSM. A plurality of sensing current signals from the stator in response to the voltage vectors applied to the PMSM may be generated.

The method includes amplifying the plurality of sensing current signals using an amplifier which may be coupled with the resistor. and converting each of the amplified sensing current signals to a digital current signal using an A/D converter coupled to the amplifier.

The method also includes calculating a plurality of rise times using a rise-time measurement circuit coupled to the A/D converter and to a controller, based upon the plurality of digital current signals received from the A/D converter and at least one A/D threshold value. In implementations where two threshold values are used, the A/D threshold value may be calculated using equations 14 or 15. The A/D threshold value is influenced by the voltage threshold values as calculated by equations 12 and 13. The voltage threshold values are influenced by the current threshold values, which relationship is shown in equation 8. The controller may produce 1, 2, 6, 12, 24, or any other number of threshold currents. The number of threshold voltages and A/D threshold values correspond with the number of threshold currents produced. In one implementation, the method specifically includes calculating the plurality of rise times by producing a plurality of digital current signals from the A/D converter. When the voltage vector is applied, the rise-time measurement circuit signals to start the A/D converter. When a sensing current signal exceeds the value of the A/D threshold value, the voltage vector is no longer applied. The rise time measurement section collects the value of the digital current signal that exceeded the A/D threshold value, the value of the digital current signal immediately preceding the digital current signal that exceeded the A/D threshold value, and the rise times of the two voltage vectors corresponding with these two digital current sensing signals. The method for calculating the rise times includes using these four data to calculate the rise time as taught in equation 16.

The method may include ensuring the rise times are proportional to the coil inductances resulting from the applied voltage vectors. Equations 9 and 10 may be used to confirm that the correct current threshold value was used and that the rise times are in fact proportional to the coil inductances.

The method also includes storing the rise times in a memory which may be coupled with the rise time measurement circuit.

The method determines a rotor position relative to the stator of a PMSM using a rotor-angle estimation circuit. The rotor-angle estimation circuit may determine the rotor position by identifying a voltage vector with the shortest rise time from the plurality of applied voltage vectors. In other implementations, the rotor-angle estimation circuit may determine the rotor position by using averaged data, summed data, or summed data using weighted coefficients as previously disclosed in this document.

The method includes communicating the rotor position to the controller by the rotor-angle estimation circuit.

In places where the description above refers to particular implementations of a rotor position sensing system and implementing components, sub-components, methods and sub-methods, it should be readily apparent that a number of modifications may be made without departing from the spirit thereof and that these implementations, implementing components, sub-components, methods and sub-methods may be applied to other rotor position sensing systems.

What is claimed is:

1. A system for sensing rotor position of a permanent magnet synchronous motor, comprising:
   a controller configured to couple with a permanent magnet synchronous motor (PMSM), wherein the controller is configured to apply a plurality of voltage vectors to a PMSM to generate a plurality of sensing current signals from a stator of the PMSM in response;
   a resistor configured to couple to the stator of the PMSM, wherein the resistor is configured to receive the plurality of sensing current signals and is configured to generate a corresponding plurality of sensing voltage signals;

an amplifier coupled to the resistor, wherein the amplifier is configured to receive and to amplify the plurality of the sensing voltage signals;

a comparator coupled to the amplifier and to a threshold voltage generator, wherein the comparator is configured to receive and to compare each one of the plurality of amplified sensing voltage signals with a threshold voltage generated by the threshold voltage generator;

a rise time measurement circuit coupled to the comparator, wherein the rise time measurement circuit is configured to calculate a plurality of rise times using the plurality of amplified sensing voltage signals in response to receiving a signal from the comparator;

a memory coupled with the rise time measurement circuit, wherein the memory is configured to store the plurality of rise times; and a rotor-angle estimation circuit coupled with the memory, wherein the rotor-angle estimation circuit is configured to:
identify from the plurality of rise times a shortest rise time and a voltage vector corresponding with the shortest rise time;
identify at least two adjacent voltage vectors to the voltage vector with the shortest rise time;
one of average, sum, and weighted sum the rise times of the voltage vector corresponding with the shortest rise time and its at least two adjacent voltage vectors to form one of an average first rise time value, a summed first rise time value, and a weighted summed first rise time value, respectively;
identify the voltage vector that is 180 degrees out of phase with the voltage vector corresponding to the shortest rise time;
identify at least two adjacent voltage vectors to the voltage vector that is 180 degrees out of phase;
one of average, sum, and weighted sum the rise times of the voltage vector that is 180 degrees out of phase and its at least two adjacent voltage vectors to form one of a second average rise time value, a summed second rise time value, and a weighted summed second rise time value, respectively;
calculate a rotor position relative to the stator of the PMSM through identifying one of a lowest average rise time, a lowest summed rise time, and a lowest weighted summed rise time using one of the corresponding pair of the first average rise time value, the second average rise time value, the summed first rise time value, the summed second rise time value, the weighted summed first rise time value, and the weighted summed second rise time value, respectively.

2. The system of claim 1, wherein the threshold voltage generator is coupled to the controller and is configured to generate the threshold voltage in response to a command from the controller, wherein the threshold voltage is one of a first threshold voltage and a second threshold voltage.

3. The system of claim 2, wherein the first threshold voltage and the second threshold voltage are calculated using one of a first threshold voltage equation and a second threshold voltage equation;
wherein the first threshold voltage equation is $$V_{th1}=(G)(R_{sh})(I_{th1})+V_{off}$$

and the second threshold voltage equation is $$V_{th2}=(G)(R_{sh})(I_{th2})+V_{off}$$

where $V_{th1}$ is the first threshold voltage, $V_{th2}$ is the second threshold voltage, G is a gain of the amplifier, $R_{sh}$ is a resistance from the resistor, $I_{th1}$ is a first threshold current, $I_{th2}$ is a second threshold current, and $V_{off}$ is the amplifier's offset voltage.

4. The system of claim 3, wherein the first threshold current and the second threshold current are related by the equation $$I_{th1} = \frac{4}{3}I_{th2}.$$

5. The system of claim 1, wherein the plurality of voltage vectors is one of 12 and 24.

6. A system for sensing rotor position of a permanent magnet synchronous motor, comprising:
a controller configured to couple with a permanent magnet synchronous motor (PMSM), wherein the controller is configured to apply a plurality of voltage vectors to a stator of a PMSM which generates a plurality of sensing current signals from the stator of the PMSM in response to the plurality of voltage vectors;
an amplifier configured to couple to the PMSM, wherein the amplifier is configured to receive and to amplify the plurality of the sensing current signals;
an analog to digital (A/D) converter coupled to the amplifier, wherein the A/D converter is configured to convert the plurality of the sensing current signals into a plurality of digital current signals;
a rise time measurement circuit coupled to the A/D converter and to a controller, wherein the rise time measurement circuit is configured to calculate a plurality of rise times in response to receiving a plurality of digital current signals from the A/D converter and a threshold A/D value from the controller;
a memory coupled with the rise time measurement circuit, wherein the memory is configured to store the plurality of rise times; and
a rotor-angle estimation circuit coupled with the memory, wherein the rotor-angle estimation circuit is configured to:
identify from the plurality of rise times a shortest rise time and a voltage vector corresponding with the shortest rise time;
identify at least two adjacent voltage vectors to the voltage vector with the shortest rise time;
one of average, sum, and weighted sum the rise times of the voltage vector corresponding with the shortest rise time and its at least two adjacent voltage vectors to form one of an average first rise time value, a summed first rise time value, and a weighted summed first rise time value, respectively;
identifying the voltage vector that is 180 degrees out of phase with the voltage vector corresponding to the shortest rise time;
identify at least two adjacent voltage vectors to the voltage vector that is 180 degrees out of phase;
one of average, sum, and weighted sum the rise times of the voltage vector that is 180 degrees out of phase and its at least two adjacent voltage vectors to form one of a second average rise time value, a summed second rise time value, and a weighted summed second rise time value, respectively;
calculate a rotor position relative to the stator of the PMSM by determining one of a lowest average rise time, a lowest summed rise time, and a lowest weighted summed rise time using one of the corresponding pair of the first average rise time value, the second average rise time value, the summed first rise time value, the summed second rise time value, the weighted summed first rise time value, and the weighted summed rise time value, respectively.

7. The system of claim 6, wherein the controller is configured to generate a first threshold current and a second threshold current, wherein the first threshold current and the second threshold current are related by the equation $$I_{th1} = \frac{4}{3}I_{th2}$$

where $I_{th1}$ is the first threshold current and $I_{th2}$ is the second threshold current.

8. The system of claim 6, wherein the controller is configured to generate a first A/D threshold value and a second A/D threshold value using one of a first A/D threshold value equation and a second A/D threshold value equation;
wherein the first A/D threshold value equation is $$AD_{th1} = V_{th1}\left(\frac{2^n}{Vref_{AD}}\right)$$

and the second A/D threshold value equation is $$AD_{th2} = V_{th2}\left(\frac{2^n}{Vref_{AD}}\right)$$

where $AD_{th1}$ is the first A/D threshold value, $AD_{th2}$ is the second A/D threshold value, $V_{th1}$ is a first threshold voltage, $V_{th2}$ is a second threshold voltage, n is the A/D resolution, and $Vref_{AD}$ is a full scale voltage value.

9. The system of claim 6, wherein the rise time measurement circuit measures each rise time using a rise time measurement equation:
wherein the rise time measurement equation is $$T_r = \left(\frac{AD_{th} - AD_1}{AD_2 - AD_1}\right)(t_2 - t_1) + t_1$$

where $T_r$ is the rise time, $AD_{th}$ is one of the first A/D value threshold and the second A/D value threshold, $AD_2$ is a first value from the A/D converter formed when $AD_2$ exceeds $AD_{th}$, $AD_1$ is a second value from the A/D converter formed prior to $AD_1$ exceeding $AD_{th}$, $t_2$ is a time corresponding with $AD_2$, and $t_1$ is a time corresponding with $AD_1$.

10. The system of claim 6, wherein the plurality of voltage vectors is one of 12 and 24.

11. A method for sensing rotor position of a permanent magnet synchronous motor, the method comprising:
applying a plurality of voltage vectors to a stator of a permanent magnet synchronous motor (PMSM);
generating a plurality of sensing current signals from the stator in response to the plurality of voltage vectors applied to the PMSM;
converting the plurality of sensing current signals into a plurality of sensing voltage signals using a resistor coupled to the stator;
amplifying the plurality of sensing voltage signals using an amplifier coupled to the resistor;
comparing each of the amplified plurality of sensing voltage signals with a threshold voltage generated by a threshold voltage generator using a comparator coupled to the amplifier;
calculating a plurality of rise times using the amplified plurality of sensing voltage signals and a signal from the comparator using a rise time measurement circuit coupled to the comparator;
storing the plurality of rise times in a memory coupled with the rise-time measurement circuit;
determining a rotor position relative to the stator of the PMSM using a rotor-angle estimation circuit by:
identifying from the plurality of rise times a shortest rise time and a voltage vector corresponding with the shortest rise time;
identifying at least two adjacent voltage vectors to the voltage vector with the shortest rise time;
one of averaging, summing, and weighted summing the rise times of the voltage vector corresponding with the shortest rise time and its at least two adjacent voltage vectors to form one of an average first rise time value, a summed first rise time value, and a weighted summed first rise time value, respectively;
identifying the voltage vector that is 180 degrees out of phase with the voltage vector corresponding to the shortest rise time;
identifying at least two adjacent voltage vectors to the voltage vector that is 180 degrees out of phase;
one of averaging, summing, and weighted summing the rise times of the voltage vector corresponding with the voltage vector that is 180 degrees out of phase and its at least two adjacent voltage vectors to form one of a second average rise time value, a summed second rise time value, and a weighted summed second rise time value, respectively;
calculating the rotor position relative to the stator by determining one of a lowest average rise time, a lowest summed rise time, and a lowest weighted summed rise time using one of the corresponding pair of the first average rise time value, the second average rise time value, the summed first rise time value, the summed second rise time value, the weighted summed first rise time value, and the weighted summed second rise time value, respectively.

12. The method of claim 11, further comprising generating the threshold voltage using the threshold voltage generator in response to a command from the controller coupled with the threshold voltage generator, wherein the threshold voltage is one of a first threshold voltage and a second threshold voltage.

13. The method of claim 12, wherein the first threshold voltage and the second threshold voltage are calculated using one of a first threshold voltage equation and a second threshold voltage equation;
wherein the first threshold voltage equation is $$V_{th1} = (G)(R_{sh})(I_{th1}) + V_{off}$$

and the second threshold voltage equation is $$V_{th2} = (G)(R_{sh})(I_{th2}) + V_{off}$$

where $V_{th1}$ is the first threshold voltage, $V_{th2}$ is the second threshold voltage, G is a gain of the amplifier, $R_{sh}$ is a resistance from the resistor, $I_{th1}$ is a first threshold current, $I_{th2}$ is a second threshold current, and $V_{off}$ is the amplifier's offset voltage.

14. The method of claim 13, wherein the first threshold current and the second threshold current are related by the equation $$I_{th1} = \frac{4}{3} I_{th2}.$$

15. The method of claim 11, wherein the plurality of voltage vectors is one of 12 and 24.

16. A method for sensing rotor position of a permanent magnet synchronous motor, the method comprising:
applying a plurality of voltage vectors to a stator of a permanent magnet synchronous motor (PMSM);
generating a plurality of sensing current signals from the stator in response to the plurality of voltage vectors applied to the PMSM;
amplifying the plurality of sensing current signals by an amplifier coupled to the PMSM;
converting a plurality of sensing current signals into a plurality of digital current signals using an analog to digital (A/D) converter coupled to the amplifier;
calculating a plurality of rise times, using a rise-time measurement circuit coupled to the A/D converter and to a controller, based upon the plurality of digital current signals received from the A/D converter and an A/D threshold value from the controller;
storing the plurality of rise times in a memory coupled with the rise-time measurement circuit;
using a rotor-angle estimation circuit coupled with the memory to determine a rotor position relative to a stator by:
identifying from the plurality of rise times a shortest rise time and a voltage vector corresponding with the shortest rise time;
identifying at least two adjacent voltage vectors to the voltage vector with the shortest rise time;
one of averaging, summing, and weighted summing the rise times of the voltage vector corresponding with the shortest rise time and its at least two adjacent voltage vectors to form one of an average first rise time value, a summed first rise time value, and a weighted summed first rise time value, respectively;
identifying the voltage vector that is 180 degrees out of phase with the voltage vector corresponding to the shortest rise time;
identifying at least two adjacent voltage vectors to the voltage vector that is 180 degrees out of phase;
one of averaging, summing, and weighted summing the rise times of the voltage vector corresponding with the voltage vector that is 180 degrees out of phase and its at least two adjacent voltage vectors to form one of a second average rise time value, a summed second rise time value, and a weighted summed second rise time value, respectively;
calculating the rotor position relative to the stator by calculating one of a lowest average rise time, a lowest summed rise time, and a lowest weighted summed rise time using one of the corresponding pair of the first average rise time value, the second average rise time value, the summed first rise time value, the summed second rise time value, the weighted summed first rise time value, and the weighted summed second rise time value, respectively.

17. The method of claim 16, further comprising generating a first threshold current and a second threshold current using the controller, wherein the first threshold current and the second threshold current are related by the equation $$I_{th1} = \frac{4}{3} I_{th2}$$

where $I_{th1}$ is the first threshold current and $I_{th2}$ is the second threshold current.

18. The method of claim 16, further comprising measuring each rise time with the rise time measurement circuit using a rise time measurement equation;
wherein the rise time measurement equation is $$T_r = \left(\frac{AD_{th} - AD_1}{AD_2 - AD_1}\right)(t_2 - t_1) + t_1$$

where $T_r$ is the rise time, $AD_{th}$ is one of the first A/D value threshold and the second A/D value threshold, $AD_2$ is a first value from the A/D converter formed when $AD_2$ exceeds $AD_{th}$, $AD_1$ is a second value from the A/D converter formed prior to $AD_1$ exceeding $AD_{th}$, $t_2$ is a time corresponding with $AD_2$, and $t_1$ is a time corresponding with $AD_1$.

19. The method of claim 16, wherein the plurality of voltage vectors is one of 12 and 24.

* * * * *